United States Patent
Mukherjee et al.

(10) Patent No.: US 8,830,990 B2
(45) Date of Patent: Sep. 9, 2014

(54) USING A COMMON MEDIA GATEWAY NODE AND A COORDINATED CODEC BY AN ORIGINATING AND A TERMINATING CALL CONTROL NODE

(75) Inventors: Subrata Mukherjee, Plano, TX (US); Henry Zheng, Shanghai (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 237 days.

(21) Appl. No.: 13/391,229

(22) PCT Filed: Aug. 21, 2009

(86) PCT No.: PCT/CN2009/000959
§ 371 (c)(1),
(2), (4) Date: May 2, 2012

(87) PCT Pub. No.: WO2011/020221
PCT Pub. Date: Feb. 24, 2011

(65) Prior Publication Data
US 2012/0207148 A1    Aug. 16, 2012

(51) Int. Cl.
*H04L 12/66* (2006.01)
*H04W 76/02* (2009.01)
*H04W 88/16* (2009.01)
*H04W 28/06* (2009.01)

(52) U.S. Cl.
CPC ............ *H04W 76/022* (2013.01); *H04W 88/16* (2013.01); *H04W 28/06* (2013.01)
USPC .......................................................... 370/352

(58) Field of Classification Search
None
See application file for complete search history.

(56) References Cited

U.S. PATENT DOCUMENTS

2003/0219006 A1 *  11/2003  Har .............................. 370/352

(Continued)

FOREIGN PATENT DOCUMENTS

CN           1784030 A      6/2006

(Continued)

OTHER PUBLICATIONS

"3GPP Technical Specification Group Services and System Aspects; Intra-domain connection of Radio Access Network (RAN) nodes to multiple Core Network (CN) nodes (Release 8)" 3GPP TS 23.236 V8.0.0. Dec. 2008. 3GPP, Sophia-Antipolis, France.

(Continued)

*Primary Examiner* — Minh-Trang Nguyen
(74) *Attorney, Agent, or Firm* — Coats & Bennett, PLLC

(57) ABSTRACT

A method for a call control node (MSC-S2) for setting up transmission of voice data from a calling party (BSC1) towards a called party (BSC2) via at least one media gateway node (MGW-1, MGW-2) is provided, said call control node (MSC-S2) acting as a terminating call control node being adapted for communicating with the at least one media gateway node (MGW-1) and with an originating call control node (MSC-S1), the method comprising receiving first information from the originating call control node (MSC-S1) indicative of at least one media gateway node (MGW-1, MGW-2) usable for transmitting the voice data, receiving second information from the originating call control node (MSC-S1) indicative of a codec (PCM) to be used from the calling party (BSC1) towards the at least one media gateway node (MGW-1, MGW-2) usable for transmitting the voice data, determining whether the voice data is transmittable by the at least one media gateway node (MGW-1, MGW-2) towards the called party (BSC2) encoded by said codec (PCM)1 determining whether a common media gateway node (MGW-1) is usable by both the originating call control node (MSC-S1) and the terminating call control node (MSC-S2), sending first backward information to the originating call control node (MSC-S1) indicative of the said codec (PCM), and sending second backward information to the originating call control node (MSC-S1) indicative of the common media gateway node (MGW-1).

18 Claims, 10 Drawing Sheets

(56) References Cited

U.S. PATENT DOCUMENTS

2006/0114868 A1    6/2006  Park
2009/0003570 A1*  1/2009  Sindhwani et al. ........... 379/157
2009/0122743 A1    5/2009  Ye et al.

FOREIGN PATENT DOCUMENTS

| CN | 1882120 A | 12/2006 |
|---|---|---|
| CN | 101005633 A | 7/2007 |
| CN | 101360333 A | 2/2009 |
| EP | 1928187 A1 | 6/2008 |

OTHER PUBLICATIONS

"Mobile Soft Switch Solution of Ericsson." Telecom World, Jun. 2006, No. 6, pp. 72-73. China Academic Journal Electronic Publishing House. China.

International Search Report, international application No. PCT/CN2009/000959. Date of mailing: May 13, 2010. SIPO, Beijing, China.

* cited by examiner

USING A COMMON MEDIA GATEWAY NODE AND A COORDINATED CODEC BY AN ORIGINATING AND A TERMINATING CALL CONTROL NODE

TECHNICAL FIELD

The invention relates to telecommunication, particularly to a method for a call control node for setting up transmission of voice data from a calling party towards a called party via at least one media gateway node, a terminating call control node for setting up transmission of voice data from a calling party towards a called party via at least one media gateway node, a program element adapted to perform such a method, and a computer-readable medium comprising such a program element.

BACKGROUND

Transmitting data from a calling party towards a called party via a communications network is based on the use of nodes which are adapted to enable the transmission of data from the calling party towards the called party. The data to be transmitted from the calling party to the called party is exchanged in a user plane of a transmission path, wherein nodes are arranged in the user plane via which the data is exchangeable. The transmitted data is usually encoded by a particular codec. In a control plane of the transmission path, further nodes may be arranged which are adapted to control the data transmission in the user plane.

Conventionally, the communications network architecture comprises a Radio Access Network (RAN) adapted for communicating data of a mobile communication entity such as a mobile phone or a laptop and a Core Network (CN) adapted for communicating data towards another or the same Radio Access Network or towards a public switched telephone network (PSTN).

In the following, transmitting voice data via the Radio Access Network will be described.

The network architecture of the Radio Access Network comprises a base station controller (BSC) in the case of GSM Radio Access (GERAN/GRAN) and a radio network controller (RNC) in the case of Universal Terrestrial Radio Access Network (UTRAN), respectively, both being adapted to communicate with nodes of a Core Network, such as call control nodes and Media Gateways (MGw). Media Gateway nodes typically are controlled by one or more call control nodes such as Mobile Switching Centre (MSC)/Mobile Switching Centre Servers (MSC-S).

A user plane of the transmission path comprises the Base Station Controllers and/or the Radio Network Controllers, and the media gateway nodes. A control plane of the transmission path comprises the Base Station Controllers and/or the Radio Network Controllers, and the call control node(s).

If a BSC or a RNC node is connected to a plurality of call control nodes, allowing for load balancing and redundancy, this is often referred to as MSC in pool (MiP).

Transmitting voice data from a calling party towards a called party via at least one media gateway node requires setting up the transmission of the voice data. In particular, a coding of the voice data to be transmitted may be performed in the user plane of the transmission path using at least one codec. In particular, coding operations of the voice data within the user plane are based on Out of Band Transcoder Control (OoBTC) procedures which allows for negotiating the codec types or codec modes on a call-by-call basis using out of band signaling such that a proper speech quality and/or an efficient use of bandwidth may be achieved.

In the context of this application, the term "set up a transmission of voice data" may particularly denote any initialization or starting of a data transmission, wherein parameters or characteristics for the data transmission may be defined. In particular, a calling party, a called party and/or a data transmission path may be determined. In particular, a set up of the data transmission may be negotiated in a control plane of the transmission path.

The term "calling party" may particularly denote any communication partner device which may be adapted to initiate or start a voice transmission from one connection point to another connection point. In particular, a calling party may be a source of the voice data (such as a user equipment) to be transmitted towards at least one communication partner device or may be any communication partner device (such as a base station controller) arranged downstream of the voice data source in a transmission path.

The term "called party" may particularly denote any communication partner device which may be adapted to terminate or to be a termination of a voice data transmission path from one connection point to another connection point. In particular, a called party may be a destination of the voice data (such as a user equipment) to be transmitted or may be any communication partner device (such as a base station controller) arranged in a transmission path upstream of the voice data destination.

The term "user plane" may particularly denote a plane or level in a data transmission path in which payload data such as voice data is transmitted.

The term "control plane" may particularly denote a plane or level in a data transmission path in which controlling of the data transmission, particularly of the user plane data transmission path, may be performed. Within the "control plane" signaling traffic pertaining to a (intended) user plane traffic is handled. Therefore "control plane" is often also referred as "signaling plane".

The term "node" may particularly denote a communication partner device which may be configured for communication with one or more other nodes or communication partner devices in a network architecture. In particular, a node may be part of a user plane or a control plane of a data transmission path.

The term "call control node" may particularly denote any kind of node adapted to control at least part of a user plane transmission path from a calling party towards a called party. In particular, a call control node may be adapted to communicate with at least one of a calling party, a called party, and at least one media gateway node.

The term "media gateway node" may particularly denote any node via which voice data is transmittable. A media gateway node may comprise an access or incoming termination and an outgoing termination, wherein the incoming termination and the outgoing termination may be adapted to receive voice data according to a particular codec and to send transmitted voice data encoded by a particular codec, respectively.

The term "codec" may particularly denote a coding format or a coding scheme usable for encoding voice data to be transmitted. In particular, when changing a particular codec of the data to a further codec of the data, transcoding operations may be applied to the data.

Referring to FIG. 10, an example of a Network comprising a Media Switching Center in Pool (MIP) is illustrated. The Network comprises three Base Station Controllers BSC1, BSC2, BSC3, each of which being adapted to communicate with a different one of three media gateway nodes MGW-1, MGW-2, MGW-3, respectively. Each of the media gateway nodes MGW-1, MGW-2, MGW-3 can be controlled by any of three call control nodes MSC-S1, MSC-S2, MSC-S3 being adapted as Mobile Switching Center Servers. The media gateway nodes MGW-1, MGW-2, MGW-3 and the call control nodes MSC-S1, MSC-S2, MSC-S3 form a Core Network (CN).

According to the network architecture, each call control node MSC-S1, MSC-S2, MSC-S3 is adapted to serve traffic, particularly is adapted to control a transmission of voice data, via each one of the media gateway nodes MGW-1, MGW-2, MGW-3. Therefore, a failure of a call control node MSC-S1, MSC-S2, MSC-S3 or a media gateway node MGW-1, MGW-2, MGW-3 may be compensated in that a further call control node MSC-S1, MSC-S2, MSC-S3 can be used for controlling the transmission of the voice data or a further media gateway node MGW-1, MGW-2, MGW-3 can be used for transmitting the voice data, respectively. Further, load balancing may be achieved for multiple transmissions of voice data, since various media gateway nodes MGW-1, MGW-2, MGW-3 may be used for transmitting voice data.

In particular, a transmission of voice data from the Base Station Controller BSC1 to the Base Station Controller BSC2 via the media gateway nodes MGW-1 and MGW-2 will be described in the following in more detail.

Referring to FIG. 11, setting up the transmission of the voice data for a call is illustrated. The transmission of voice data from the originating Base Station Controller BSC1 to the terminating Base Station Controller BSC2 via the two media gateway nodes MGW-1, MGW-2 is controlled by the two call control nodes MSC-S1, MSC-S2. The call control node MSC-S1 is adapted to control at least the media gateway node MGW-1, and the call control node MSC-S2 is adapted to control at least the media gateway node MGW-2.

Both the originating Base Station Controller BSC1 and the terminating Base Station Controller BSC2 are adapted to use Pulse Code Modulation (PCM) as codec when communicating or exchanging the voice data via the media gateway nodes MGW-1, MGW-2. The transmission of the voice data within the media gateway nodes MGW-1, MGW-2 is based on signal transcoding from PCM to compressed speech (CS) and signal transcoding from CS to PCM. In particular, a first termination T1 of the media gateway node MGW-1 is seized to PCM as the type for the incoming voice data. A second termination T2 of the media gateway node MGW-1 representing an outgoing termination of the media gateway node MGW-1 is adapted to operate on the codec type CS, as a first termination T3 of the media gateway node MGW-2 does. A second termination T4 of the media gateway node MGW-2 representing an outgoing termination is adapted to send the transmitted voice data towards the base station controller BSC2 using the PCM.

The termination T1 and the termination T2 are part of a so called context C1, while the termination T3 and the termination T4 are part of another context C2. In the context of this application, the term "termination" may particularly denote a source or sink of one or more media streams, such as voice. In the examples shown, the terminations T1 and T3 are sinks for the direction of a voice stream towards BSC2, while the terminations T2 and T4 are sources for the direction of a voice stream towards BSC2. In the opposite voice stream direction of the examples shown, the terminations T1 and T3 are sources for the direction of a voice stream towards BSC1, while the terminations T2 and T4 are sinks for the direction of a voice stream towards BSC1.

The term "context" may particularly denote an association between a collection of terminations. In the examples shown, the context C1 is an association of the terminations T1 and T2, while the context C2 is an association of the termination T3 and T4. Although only 2 termination contexts are shown, further contexts comprising two or more terminations may be present in the user plane.

In this example, the coding operations of the voice data within the media gateway nodes MGW-1, MGW-2 are based on Out of Band Transcoder Control procedures. In particular, the coding operations C1 and C2 used within the media gateway nodes MGW-1, MGW-2 are defined by OoBTC used for negotiating a selected codec.

Transmission of encoded speech between the contexts C1 and C2 is wanted to increase bandwidth efficiency within the Core Network, and the negotiation via OoBTC is adapted to reach this goal. This approach accepts that, when using the network configuration as described above, the speech quality of the transmitted voice data may be somewhat deteriorated, and a system resource usage of the media gateway nodes MGW-1, MGW-2 may be significantly increased due to the encoding and decoding operations within the contexts C1, C2.

Referring to FIG. 12, a further set up of a transmission of voice data from the Base Station Controller BSC1 towards the Base Station Controller BSC2 is illustrated.

The network configuration during this set up of the data transmission is similar to the network configuration illustrated in FIG. 11. However, the user plane comprises only one media gateway node MGW-1 via which the voice data is transmittable. The call control node MSC-S1 is adapted to control an originating side of the media gateway node MGW-1, and the call control node MSC-S2 is adapted to control a terminating side of the media gateway node MGW-2.

Similarly to FIG. 11, the originating Base Station Controller BSC1 is adapted to use PCM as type for encoding the voice data transmitted towards a first termination T1 of the media gateway node MGW-1. The terminating Base Station Controller BSC2 is adapted to operate on PCM as type which is also used by the fourth termination T4 of the media gateway node MGW-1. The originating call control node MSC-S1 and the terminating call control node MSC-S2 are adapted to enforce a selected codec, particularly compressed speech CS, on the second termination T2 and the third termination T3 of the media gateway node MGW-1, respectively. Thus, transcoding operations C1, C2 are existent within the media gateway node MGW-1 when transmitting the voice data.

However, setting up the transmission of voice data as illustrated in FIG. 12 may also result in an unnecessary consumption of processing capacity of the media gateway node MGW-1 as well as in a degradation of the speech quality of the transmitted voice data. Because both contexts C1 and C2 are now located within the same media gateway node MGW-1, no network bandwidth saving can be achieved, since PCM to PCM is used within the media gateway node MGW-1 for the access and termination codecs and an encoding towards CS and decoding back to PCM may deteriorate speech quality and will add up processing load.

SUMMARY

It is an object of the invention to allow for a proper quality of the voice data transmitted from a calling party to a called party.

In order to achieve the object defined above, a method for a call control node for setting up transmission of voice data from a calling party towards a called party via at least one media gateway node, a terminating call control node for setting up transmission of voice data from a calling party towards a called party via at least one media gateway node, a program element, and a computer-readable medium according to the independent claims are provided.

According to an exemplary embodiment of the invention, a method for a call control node for setting up transmission of voice data from a calling party towards a called party via at least one media gateway node is provided. The call control node acts as a terminating call control node and is adapted for communicating with the at least one media gateway node and with an originating call control node.

The method comprises receiving first information from the originating call control node indicative of at least one media gateway node usable for transmitting the voice data and comprises receiving second information from the originating call control node indicative of a codec to be used from the calling party towards the at least one media gateway node usable for transmitting the voice data.

The method comprises determining whether the voice data is transmittable by the at least one media gateway node towards the called party encoded by said codec and comprises determining whether a common media gateway node is usable by both the originating call control node and the terminating call control node. The method comprises sending first backward information to the originating call control node indicative of said codec and comprises sending second backward information to the originating call control node indicative of the common media gateway node.

According to another exemplary embodiment of the invention, a terminating call control node for setting up transmission of voice data from a calling party towards a called party via at least one media gateway node is provided. The terminating call control node is adapted for communicating with the at least one media gateway node and with an originating call control node. The terminating call control node comprises means for receiving first information from the originating call control node indicative of a media gateway node usable for transmission of the voice data and comprises means for receiving second information from the originating call control node indicative of a codec to be used from the calling party towards the at least one media gateway node usable for transmitting the voice data. The terminating call control node comprises means for determining whether the voice data is transmittable by the at least one media gateway node towards the called party encoded by said codec and comprises means for determining whether a common media gateway node is usable by both the originating call control node and the terminating call control node. The terminating call control node comprises means for sending first backward information to the originating call control node indicative of said codec and comprises means for sending second backward information to the originating call control node indicative of the common media gateway node.

According to another exemplary embodiment of the invention, a program element is provided. The program element, when being executed by a processor, is adapted to carry out or control a method as mentioned above.

According to another exemplary embodiment of the invention, a computer-readable medium is provided. In the computer-readable medium a computer program is stored. The computer program is adapted, when being executed by a processor, to carry out or control a method as mentioned above.

In particular, the computer-readable medium may be a permanent or a rewritable memory within a respective device or located externally. A program element of a computer program may be also transferred to a respective device for example via a cable or a wireless link as a sequence of signals.

In particular, data processing which may be performed according to embodiments of the invention may be realized by a computer program or a program element, that is by software, or by using one or more special electronic optimization circuits, that is in hardware, or in a hybrid form, that is by means of software components and hardware components.

The explanations of the terms in the section "Background" also apply to exemplary embodiments of the invention.

In the context of this application, the term "originating call control node" may particularly denote a call control node being adapted to control and communicate with an originating side of a communications network configuration. In particular, an originating call control node may be adapted to control or communicate with at least one of a calling party and at least one media gateway node. In particular, an originating call control node may be adapted to control at least one codec type usable by the at least one media gateway node, wherein the codec type may be enforceable by the originating call control node on at least one termination of the at least one media gateway node, particularly on an outgoing termination of an originating side of the at least one media gateway node.

The term "terminating call control node" may particularly denote a call control node being adapted to control and communicate with a terminating side of a communications network configuration. In particular, a terminating call control node may be adapted to control or communicate with at least one of a called party and at least one media gateway node. In particular, an originating call control node may be adapted to control at least one codec type usable by the at least one media gateway node, wherein the codec type may be enforceable by the terminating call control node on at least one termination of the at least one media gateway node, particularly on an incoming or access termination of a terminating originating side of the at least one media gateway node.

According to the exemplary embodiments of the invention, a communication architecture may be provided which may accomplish setting up a transmission of voice data in such a way that unnecessary transcoding operations of the transmitted voice data in a user plane of a data transmission path within a common media gateway node are suppressed, since a common codec may be selectable within the common media gateway node. Thus, the voice data provided by the calling party may be transmitted to a called party in that the voice data provided to the common media gateway node may be encoded using a particular codec which remains unchanged within the media gateway node used for transmitting the voice data. Thus the voice data transmitted from the media gateway node may be encoded with the same codec as the incoming voice data. In particular, the codec to be used from the calling party towards the called party and the codec to be used from the media gateway node towards the called party may be the codec of a for instance wireless interface or the codecs used by the calling party and the called party, respectively. In particular, the common codec used within the media gateway node may be identical to at least one of a codec used by the calling party and a codec used by the called party. Further, setting up the transmission of voice data may be based on selecting a common media gateway node which is usable by both the calling party and the called party.

In particular, a terminating call control node may be adapted to communicate with an originating call control node in accordance with the above architecture, wherein each of the originating call control node and the terminating call control node may be adapted to control at least one media gateway node arranged in a transmission path between a calling party and a called party.

The originating call control node may possess first information indicative of at least one media gateway node usable for transmitting the voice data. Further, the originating call control node may possess second information indicative of the codec to be used from the calling party towards the at least one media gateway node. The originating call control node may be adapted to send the first information and the second information to the terminating call control node.

The terminating call control node may be adapted to receive the first information and the second information. The terminating call control node may be adapted to then determine whether the voice data may be transmittable by the at least one media gateway node, particularly from the at least one media gateway node, towards the called party encoded by the codec to be used from the calling party towards the at least one media gateway node.

Further, the terminating call control node may be adapted to determine whether a common media gateway node may be usable by both the originating call control node and the terminating call control node for transmitting the voice data.

The determinations may be enabled in that the terminating call control node may possess information indicative of a codec to be used by the media gateway node towards the called party and may possess information indicative of the media gateway nodes usable for transmitting the voice data to the called party, respectively.

Thus, the terminating call control node may be adapted to detect that a two context transmission configuration of the voice data via a common media gateway node may be possible for transmitting the voice data.

Subsequent to determining that the voice data may be transmittable by the common media gateway node encoded by the codec to be also used from the calling party towards at least one the media gateway node, the terminating call control node may be adapted to select the common media gateway node for transmitting the voice data and to select the common codec at least for the terminating side of the transmission path of the voice data. In particular, the terminating call control node may be adapted to enforce or propose the selected codec at the terminating side of the common media gateway node.

Further, the terminating call control node may be adapted to inform the originating call control node on the common media gateway node to be used for transmitting the voice data and on the common codec usable within the common media gateway node in sending first and second backward information to the originating call control node.

The originating call control node may be adapted to select the common media gateway node for transmitting the voice data and to select the common codec for transmitting the voice data at least for the originating side of the transmission path of the voice data. In particular, the originating call control node may be adapted to enforce or propose the common codec at the originating side of the common media gateway node.

In suppressing unnecessary transcoding operations within the common media gateway node a high speech quality of the transmitted voice data, particularly an improved speech quality of the transmitted voice data, may be achieved. In particular, a degradation of the speech quality of the voice data resulting from transcoding operations within the at least one media gateway node or between two different media gateway nodes may be at least reduced or eliminated.

Further, suppressing of unnecessary transcoding operations may cause a processing capacity of the nodes involved in transmitting the voice data, particularly of the common media gateway node, to be saved in that a consumption of the processing capacity of the media gateway node necessary for transcoding the voice data within the media gateway node may be reduced.

However, since the transmission of voice data may be accomplished via two contexts within a single media gateway node, the issue of bandwidth saving may be not addressed by the communication architecture according to exemplary embodiments of the invention. Next, further exemplary embodiments of the method for a call control node for setting up transmission of voice data from a calling party towards a called party via at least one media gateway node will be explained. However, these embodiments also apply to the respective terminating call control node, to the respective program element, and to the respective computer-readable medium.

In particular, the calling party and the called party may communicate to one another via the same communications network or via different communications networks. In particular, the calling party and called party may be part of the same communications network or may be part of different communications network. In particular, a called party may represent a point of interconnection between different communications networks.

In particular, if no common media gateway node may be determined by the terminating call control node, a transmission of the voice data may be accomplished using at least two media gateway nodes, particularly exactly two media gateway nodes, for transmitting the voice data. In particular, transcoding operations of the voice data to be transmitted may be present in the user plane transmission path, wherein transcoding operations of the encoded voice data from the codec to be used from the calling party towards a media gateway node to a further codec and then to a codec to be used from a media gateway node towards the called party may be present.

In particular, the communications architecture according to exemplary embodiments of the invention may also be extended to a context configuration comprising more than two contexts within a single media gateway node. In particular, such a communications architecture may comprise a three context or multiple context configuration within a single media gateway node. In particular, more than two terminations may be associated to one context. In particular, if no common media gateway node may be determined, a transmission of the voice data may be accomplished using at least two separate media gateway nodes.

The method may comprise locating a terminating communication entity serving as a destination of the transmitted voice data.

In the context of this application, the term "communication entity" may particularly denote a communication partner device which may be adapted to communicate with at least one further communication partner device. In particular, a communication entity may be a subscriber of the voice data to be transmitted. In particular, the communication entity may be part of the calling party or the called party or may be identical to the calling party or the called party, respectively.

The term "terminating communication entity" may particularly denote a communication entity being part of a terminating side of a transmission path of the voice data.

By locating a terminating communication entity, in particular a terminating subscriber, the terminating call control node may receive information from the terminating communication entity as to the codec and the media gateway nodes both usable by the terminating communication entity for transmitting the voice data. In particular, locating the terminating communication entity may be performed subsequent to at least one of receiving the first information and receiving the second information from the originating call control node.

The method may comprise determining third information for the called party indicative of at least one media gateway node usable for transmitting the voice data. Additionally or alternatively, the method may comprise determining fourth information for the called party indicative of a codec to be used by the at least one media gateway node towards the called party usable for transmitting the voice data. In particular, only the third information or only the fourth information may be determined by the terminating call control node. In particular, determining the third information for the called party and determining the fourth information for the called party may be performed subsequently or simultaneously to one another. By determining at least one of the third information and the fourth information the terminating call control node may gain knowledge of the particular media gateway nodes and/or the codec usable by media gateway node towards the called party, thus enabling the terminating call control node to determine the common media gateway node and the common codec used within the common media gateway node.

The method may comprise receiving the first information and the second information from the originating call control node in a single message. This may allow for an efficient communication mechanism, since all required information may be bundled in a common communication message.

Alternatively, the method may comprise receiving the first information and the second information from the originating call control node in separate messages. This may allow for separating the transmission of both pieces of information from one another so that multiple shorter messages may be used to transfer the required information.

The method may comprise sending the first backward information and the second backward information in a single backward message. This may allow for an efficient communication mechanism, since all required information may be bundled in a common communication message.

Alternatively, the method may comprise sending the first backward information and the second backward information in separate backward messages. This may allow for separating the transmission of both pieces of information from one another so that multiple shorter messages may be used to transfer the required information.

Transferring information, particularly control data or control data parameters, from the originating call control node to the terminating call control node or from the terminating call control node to the originating call control node in at least one (backward) message may represent appropriate measures for exchanging information between two communication partner devices. When using separate (backward) messages for the data exchange, the (backward) messages may be received subsequently or simultaneously to one another. In particular, the first (backward) information may be received prior to the second (backward) information or the first (backward) information may be received after the second (backward) information. Using a single backward message may save the processing capacity of the terminating call control node. In particular, the single message or the separate messages may be initial address messages (IAM) and the single backward message and the separate backward messages may be application transport messages (APM).

The common codec may be Pulse Code Modulation (PCM). Using PCM as the codec both usable towards the media gateway node and from the media gateway node when seen in a transmission direction may enable to transfer data via the G.711 standard. In particular, PCM may be the codec usable by a Base Station Controller or a Radio Access Controller for encoding the voice data.

At least one of the sending and receiving may be based on Bearer Independent Call Control protocol (BICC), Session Initiation Protocol (SIP) or its derivates Session Initiation Protocol-T (SIP-T) or Session Initiation Protocol-I (SIP-I). These protocols may represent examples of control plane communication protocols.

In the following, further exemplary embodiments of the terminating call control node for setting up transmission of voice data from a calling party towards a called party via at least one media gateway node will be explained. However, these embodiments also apply to the respective method, to the respective program element, and to the respective computer-readable medium.

The terminating call control node may further comprise a transceiving unit (i.e. a unit capable of providing both transmitting capability and receiving capability), wherein at least one of the means for receiving first information, the means for receiving second information, the means for determining whether the voice data is transmittable by the at least one media gateway node towards the called party encoded by said codec, the means for determining whether a common media gateway node is usable by both the originating call control node and the terminating call control node, the means for sending first backward information, and the means for sending second backward information may form part of the transceiving unit. Thus, a constructive design of the terminating call control node may be facilitated in that the functionalities of receiving information, sending backward information, and determining based on the received information may be comprised in a single unit. In particular, the transceiving unit may only comprise the means for sending first and second backward information and receiving first and second information.

The terminating call control node may further comprise means for controlling the at least one media gateway node. Thus, the terminating call control node may comprise a functionality which provides an interconnection between the control plane and the user plane. In particular, the means for controlling the at least one media gateway node may be part of the transceiving unit.

The at least one media gateway node may comprise four terminations, wherein the means for controlling the at least one media gateway node may be adapted to control the codec usable by one termination of the four terminations. In particular, the means for controlling the at least one media gateway node may be adapted to control the codec usable by an access termination on a terminating side of the at least one media gateway node.

Thus, subsequent to determining a common media gateway node and a common codec the means for controlling the at least one media gateway node may be adapted to enforce or propose a particular codec within the common media gateway node. Thus, suppression of transcoding operations within the media gateway node may be achieved.

At least one of the means for receiving first information, the means for receiving second information, the means for determining whether the voice data is transmittable by the at least one media gateway node towards the called party encoded with said codec, the means for determining whether a common media gateway node is usable by both the originating call control node and the terminating call control node, the means for sending first backward information, the means for sending second backward information, and the means for controlling the at least one media gateway node may be embodied as a unit, particularly as a processing unit (such as a Central Processing Unit (CPU) or a microprocessor). In particular, the above-described means or functionalities of the terminating call control node may be implemented in a single processing unit. Alternatively, the above-described means or functionalities of the terminating call control node may be implemented in multiple separate but cooperating processing units.

The terminating call control node may be adapted as a Mobile Switching Center server. This embodiment of the terminating call control node may enable controlling circuit-switched call services, particularly controlling the user plane of the transmission path of the voice data comprising the at least one media gateway node. The Mobile Switching Center server may be a powerful element in GSM networks or 3G core networks.

The terminating call control node may be adapted for operation in a Mobile Switching Center in Pool environment together with the originating call control node. Thus, the terminating call control node may be part of a Core Network comprising a plurality of media gateway nodes and a plurality of call control nodes. In particular, the terminating call control node may be adapted to select multiple different media gateway nodes for enabling transmission of voice data of one or more calling parties. In particular, the terminating call control node may be adapted to control and communicate with a plurality of media gateway nodes such that data transmission may be continuously be possible despite failures of a particular media gateway node.

The terminating call control node may be adapted for operating in accordance with an Out of Band Transcoder Control (OoBTC) procedure, wherein the OoBCT procedure may be particularly applicable for the BICC signaling based 3GPP network and/or the SIP or SIP-I or SIP-T signaling based 3GPP network.

According to another exemplary embodiment of the invention, an originating call control node may be provided, wherein the originating call control node may be used during setting up a transmission of voice data from a calling party towards a called party via at least one media gateway node. The originating call control node may be adapted for communicating with the at least one media gateway node and with a terminating call control node. The originating call control node may comprise means for sending first information to the terminating call control node indicative of a codec to be used from the calling party towards the at least one media gateway node usable for transmitting the voice data and means for sending second information to the terminating call control node indicative of at least one media gateway node usable for transmitting the voice data. The originating call control node may comprise means for receiving first backward information from the terminating call control node indicative of a codec usable by the at least one media gateway node towards the called party and means for receiving second backward information from the terminating call control node indicative of a common media gateway node usable by both the originating call control node and the terminating call control node.

The embodiments described for the method, the terminating call control node, the program element, and computer-readable medium also apply to the originating call control node.

The aspects defined above and further aspects of the invention are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope of the invention is not limited.

DETAILED DESCRIPTION

Figure 1:
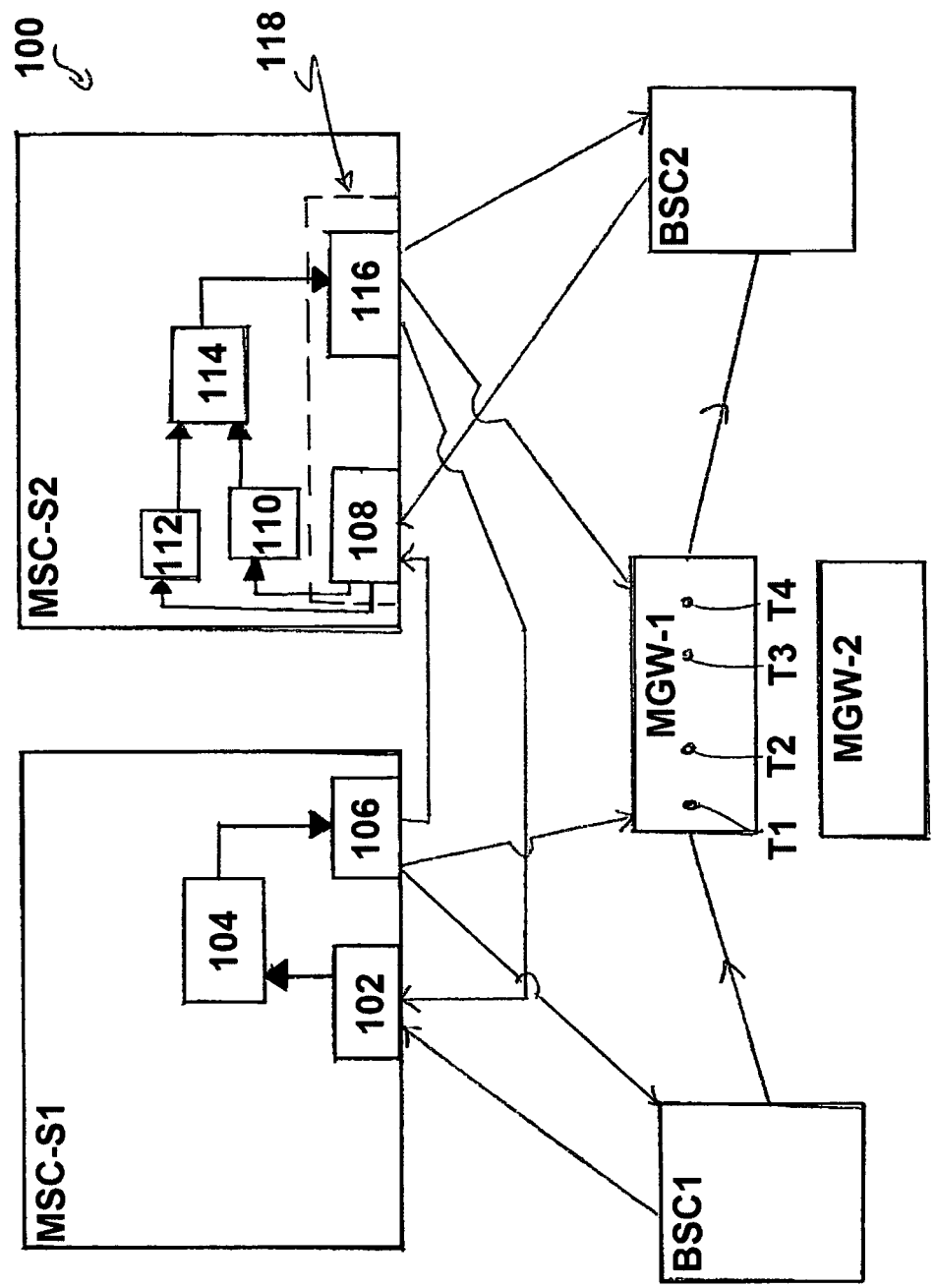
FIG. 1 is a block diagram illustrating a communication system used during a mobile to mobile call set up for a transmission of voice data according to an exemplary embodiment of the invention.

The illustration in the drawing is schematically. In different drawings, similar or identical elements are provided with the same reference signs.

According to an embodiment, a mechanism to enhance an out of band transcoder control procedure for an optimum media gateway resource usage is provided.

According to an embodiment, a call between a calling party and a called party may be set up by a terminating call control node. The voice data may be sent via a common media gateway node which is usable by both the calling party and the called party, wherein a codec of the voice data within the common media gateway node may remain unchanged, if possible.

In order to set up the data transmission during the call, the terminating call control node may receive first information and second information from an originating call control node indicative of at least one media gateway node usable for transmitting the data and indicative of a codec to be used from the calling party towards the at least one media gateway node, respectively. The terminating call control node may then determine whether the voice data is transmittable by the at least one media gateway node towards the called party encoded by the particular codec and whether a common media gateway node is usable by both the originating call control node and the terminating call control node. If both determinations are positive, the terminating call control node may send first backward information and second backward information to the originating call control node indicative of the determined particular codec and the common media gateway node. Both the terminating call control node and the originating call control node may enforce the particular codec within the common media gateway node, thereby transmission of the voice data without data transcoding within the common media gateway node being enabled.

Referring to FIG. 1, a communication system 100 used during a mobile to mobile call setup of a transmission of voice data from a calling party towards a called party via a common media gateway node is shown.

In a user plane, a calling party is adapted to communicate with a called party via a media gateway node MGW-1, MGW-2 of a plurality of media gateway nodes MGW-1, MGW-2.

The calling party comprises a mobile phone (not shown) and an originating communication entity BSC1, here a base station controller, both being adapted to communicate with one another using particular protocols of a Radio Access Network RAN. The called party comprises a terminating communication entity BSC2, here a base station controller, and a mobile phone (not shown), both being adapted to communicate with one another using equivalent protocols of the RAN. The originating communication entity BSC1 and the terminating communication entity BSC2 both use PCM (Pulse Code Modulation) as a codec of sending and receiving the voice data.

The media gateway node MGW-1 comprises four terminations T1-T4, wherein the first termination T1 being located at an originating side of the media gateway node MGW-1 corresponds to an access termination for receiving voice data from the originating communication entity BSC1 and the fourth termination T4 located at a terminating side of the media gateway node MGW-1 corresponds to an outgoing termination for transmitting the voice data to the terminating communication entity BSC2.

The second termination T2 and the third termination T3 represent an outgoing termination of the originating side and an access termination of the terminating side of the media gateway node MGW-1, respectively. The first and forth terminations T1, T4 are adapted to use PCM as a type or codec type for the voice data. The second and third terminations T2, T3 are seizable with PCM or a selected Codec SC such as compressed speech CS as a codec type of the voice data. The first termination T1 and the second termination T2 form a first 2 termination context, and the third termination T3 and the fourth termination T4 form a second 2 termination context.

In a control plane, an originating call control node MSC-S1 embodied as a Mobile Switching Center Server and a terminating call control node MSC-S2 also embodied as a Mobile Switching Center Server are adapted to communicate with one another. A communication between the originating call control node MSC-S1 and the terminating call control node MSC-S2 is based on a call control protocol such as BICC (Bearer Independent Call Control) protocol or SIP (Session Initiation Protocol) or SIP-I (Session Initiation Protocol-I) or SIP-T (Session Initiation Protocol-T). Further, the control plane comprises the originating communication entity BSC1 and the terminating communication entity BSC2.

The originating call control node MSC-S1 is adapted to control the originating communication entity BSC1 and the media gateway nodes MGW-1, MGW-2. In particular, the originating call control node MSC-S1 is adapted to enforce a particular codec at the second termination T2 of the media gateway node MGW-1. Accordingly, the terminating call control node MSC-S2 is adapted to control the terminating communication entity BSC2 and the media gateway node MGW-1. In particular, the terminating call control node MSC-S2 is adapted to enforce a certain codec on the third termination T3 of the media gateway node MGW-1.

When seen in a signal flow direction, the originating call control node MSC-S1 comprises a receiving unit 102 for receiving information comprised in messages from the originating communication entity BSC1 and the terminating call control node MSC-S2, a control unit 104 for controlling the originating communication entity BSC1 and the media gateway nodes MGW-1, MGW-2, and a transmitting unit 106 for transmitting information also comprised in messages to the terminating call control node MSC-S2 and the media gateway nodes MGW-1, MGW-2.

The terminating call control node MSC-S2 comprises a receiving unit 108 for receiving information comprised in messages from the terminating communication entity BSC2 and the originating call control node MSC-S1. Further, the terminating call control node MSC-S2 comprises a determining unit 110 for determining whether the voice data is transmittable by the media gateway nodes MGW-1 towards the called party encoded by the codec to be used from the originating communication entity BSC1 towards the media gateway nodes MGW-1, MGW-2. The terminating call control node MSC-S2 further comprises a determining unit 112 for determining whether a common media gateway node MGW-1 is usable by both the originating call control node MSC-S1 and the terminating call control node MSC-S2, with the determining units 110, 112 being arranged upstream of the receiving unit 108. Further, the terminating call control node MSC-S2 comprises a control unit 114 for controlling the communication entity BSC2 and the media gateway node MGW-1 and a transmitting unit 116 for transmitting information comprised in further messages to the originating call control node MSC-S1, the media gateway node MGW-1, and the terminating communication entity BSC2.

The receiving unit 108 and the transmitting unit 116 are comprised in a transceiving unit 118 of the terminating call control node MSC-S2.

Figure 2:
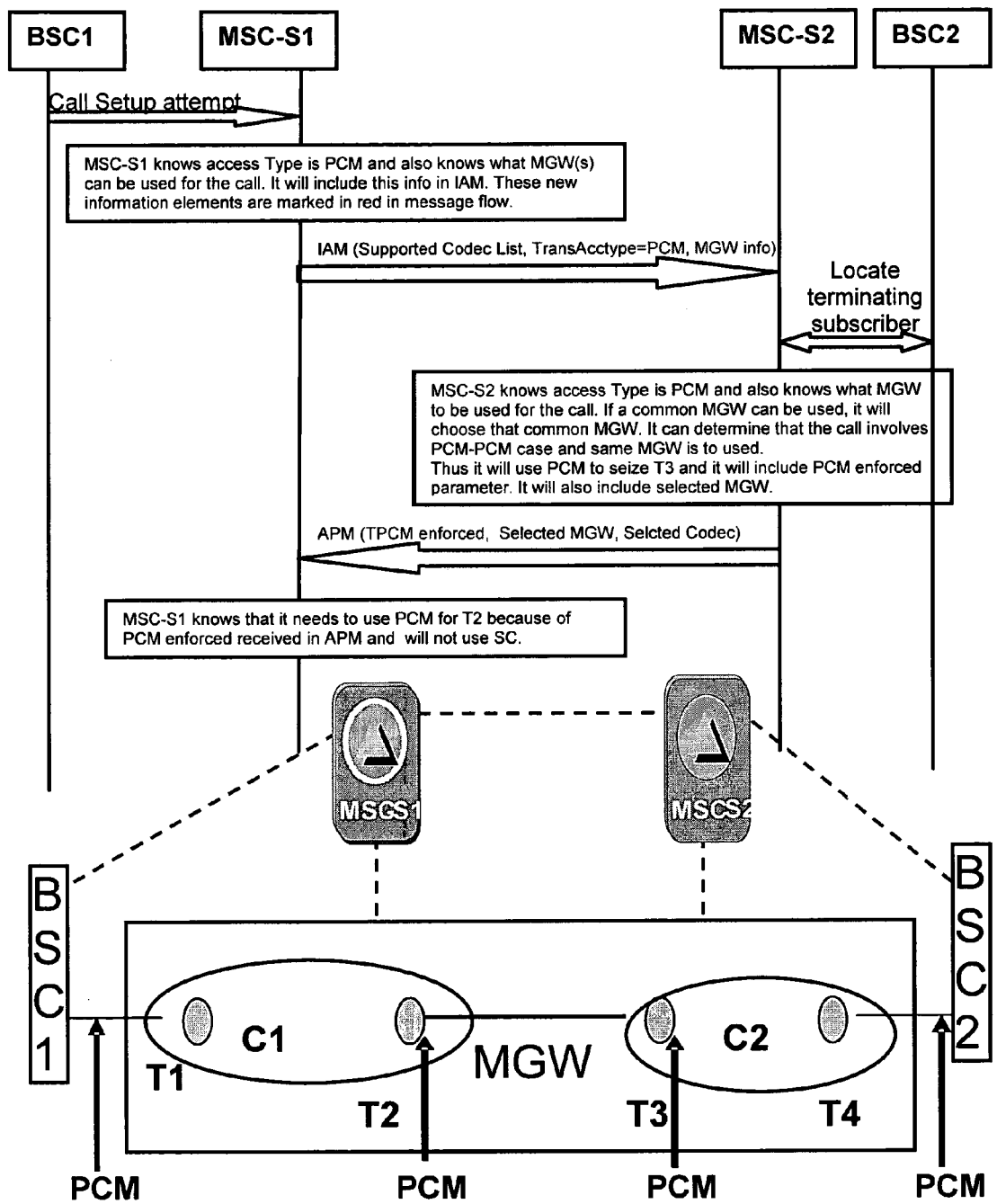
FIG. 2 is a flow diagram on a node level illustrating the set up of transmission of voice data in FIG. 1.

Referring to FIG. 2, a set up of transmission of voice data from the calling party to the called party will be explained on a node level.

The originating communication entity BSC1 sends a call setup attempt to the originating call control node MSC-S1, in order to request for setting up a connection to the called party. Therefore the originating call control node MSC-S1 possesses first information indicative of which media gateway nodes MGW-1, MGW-2 are usable by the originating call control node MSC-S1 during the call.

The first information is included in a list comprising useable media gateway nodes MGW-1, MGW-2. Further, the originating media gateway node MGW-1 possesses second information on which codec type is used from the originating communication entity BSC1 towards the media gateway node MGW-1 and thus with which codec type the first termination T1 of the media gateway node MGW-1 will be seized. In this embodiment, PCM is used as the codec.

Next, an initial address message (IAM) is sent from the originating call control node MSC-S1 to the terminating call control node MSC-S2, wherein the IAM comprises the first information (MGW info), the second information (TransAccType=PCM), and a Supported Codec List indicative of the codecs supported by the media gateway nodes MGW-1, MGW-2 for a particular call.

Upon receiving the IAM, the terminating call control node MSC-S2 possesses the first information on the media gateway nodes MGW-1, MGW-2 usable by the originating call control node MSC-S1 and the second information which codec type is usable towards the media gateway nodes MGW-1, MGW-2.

Further, subsequent to receiving the IAM from the originating call control node MSC-S1, the terminating call control node MSC-S2 locates a terminating subscriber of the call, namely the terminating communication entity BSC2, and thus determines which codec is usable towards the terminating communication entity BSC2 and which media gateway node MGW-1 is usable by the terminating call control node MSC-S2, respectively. Both determinations may be accomplished by the determining units 110 and/or 112.

Next, the determining unit 110 determines whether the voice data is transmittable by a media gateway node MGW-1, MGW-2 towards the called party encoded by the codec PCM. The determination is positive, since both the codec used towards the media gateway nodes MGW-1, MGW-2 and the codec used towards the terminating communication entity BSC2 is PCM.

Further, the determining unit 112 determines whether a common media gateway node MGW-1 is usable by both the originating call control node MSC-S1 and the terminating call control node MSC-S2. This determination is positive, since both the originating call control node MSC-S1 and the terminating call control node MSC-S2 can use the common media gateway node MGW-1.

Thus, the terminating call control node MSC-S2 detects that a 2-context-call (PCM to PCM) via a single common media gateway node MGW-1 is available for the data transmission during the call.

Next, the terminating call control node MSC-S2 selects the common media gateway node MGW-1 for the data transmission and PCM as a usable codec, thereby enforcing the third termination T3 of the chosen common media gateway node MGW-1 to be seized with PCM.

Further, the terminating call control node MSC-2 sends an application transport message (APM) back to the originating call control node MSC-S1 comprising first backward information on the selected codec PCM (PCM enforced), second backward information on the selected common media gateway MGW-1 (Selected MGW), and backward information on a selected codec (Selected Codec) which will not be used for the second termination T2 of the media gateway node MGW-1.

Next, the originating call control node MSC-S1 receives the APM and enforces PCM on the second termination T2 of the common media gateway node MGW-1.

Figure 3:
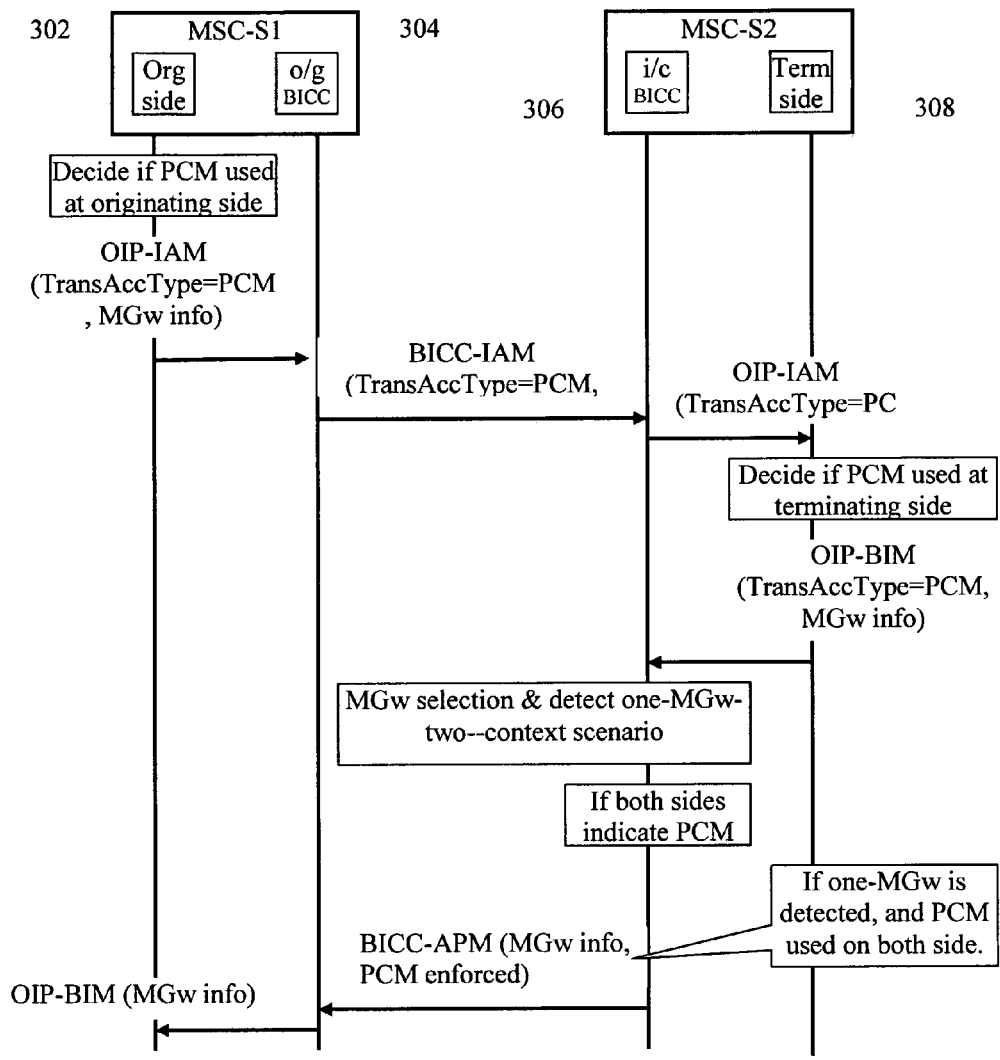
FIG. 3 is a flow diagram on a node level internal of an originating call control node and a terminating call control node in FIG. 1.

Referring to FIG. 3, a signal flow of the set up of the call in FIG. 1 on a node level internal of the originating call control node MSC-S1 and the terminating call control node MSC-S2 is shown in more detail.

The originating call control node MSC-S1 comprises an originating protocol entity 302 indicated by the term "Org side" and a terminating protocol entity 304 indicated by the term "o/g BICC" (out/going BICC) which are interworking with one another. Accordingly, the terminating call control node MSC-S2 comprises an originating protocol entity 306 indicated by the term "i/c BICC" (in/coming BICC) and a terminating protocol entity 306 indicated by the term "Term side". The originating protocol entities 302 and 306 represent incoming interfaces of the originating call control node MSC-S1 and the terminating call control node MSC-S2, respectively. Accordingly, the terminating protocol entities 304 and 308 represent outgoing interfaces of the originating call control node MSC-S1 and the terminating call control node MSC-S2, respectively.

During the set up of the data transmission, the originating protocol entity 302 of the originating call control node MSC-S1 decides, whether PCM is used from the originating communication entity BSC1 towards the media gateway nodes MGW-1, MGW-2. If PCM is detected, an open intranode protocol-initial address message (OIP-IAM) is sent to the terminating protocol entity 304 of the originating call control node MSC-S1, wherein the OIP-IAM comprises the first and second information on the codec PCM and the media gateway nodes MGW-1, MGW-2 usable for transmitting the voice data, respectively.

Next, the OIP-IAM is translated by the terminating protocol entity 304 into the IAM which is sent to the originating protocol entity 306 of the terminating call control node MSC-S2 based on the underlying communication protocol BICC, wherein the IAM comprises the information on the particular codec type PCM and the particular media gateway nodes MGW-1, MGW-2, respectively.

The originating protocol entity 306 of the terminating call control node MGC-S2 receives the IAM and translates the IAM into a further OIP-IAM which is sent to the terminating protocol entity 308 of the terminating call control node MSC-S2, wherein the further OIP-IAM comprises the first and second information. Upon translating the BICC-IAM into the OIP-IAM the Supported Codec List may be modified in that codecs which cannot be supported or understood by the terminating call control node MSC-S2 are removed.

The terminating protocol entity 308 then decides, whether PCM is used from the media gateway node MGW-1, MGW-2 towards the terminating communication entity BSC2, and subsequently sends an open intranode protocol-Bearer independent message (OIP-BIM) to the originating protocol entity 306 comprising information on the particular codec type PCM usable towards the communication entity BSC2 and the media gateway node MGW-1 usable by the terminating call control node MSC-S2 for transmitting the data.

The originating protocol entity 306 of the terminating call control node MSC-S2 thereupon detects that the two contexts situation, namely PCM to PCM, via the common media gateway node MGW-1 is available and selects the common media gateway node MGW-1.

The originating protocol entity 306 of the terminating call control node MSC-S2 sends the backward message APM using the BICC protocol back to the terminating protocol entity 304 of the originating call control node MSC-S1, wherein the APM contains the information on the selected media gateway node MGW-1 and the information that PCM is enforced on the termination T3.

The terminating protocol entity 304 of the originating call control node MSC-S1 sends a further OIP-BIM to the originating protocol entity 302 comprising the information on the selected media gateway node MGW-1.

Figure 4:
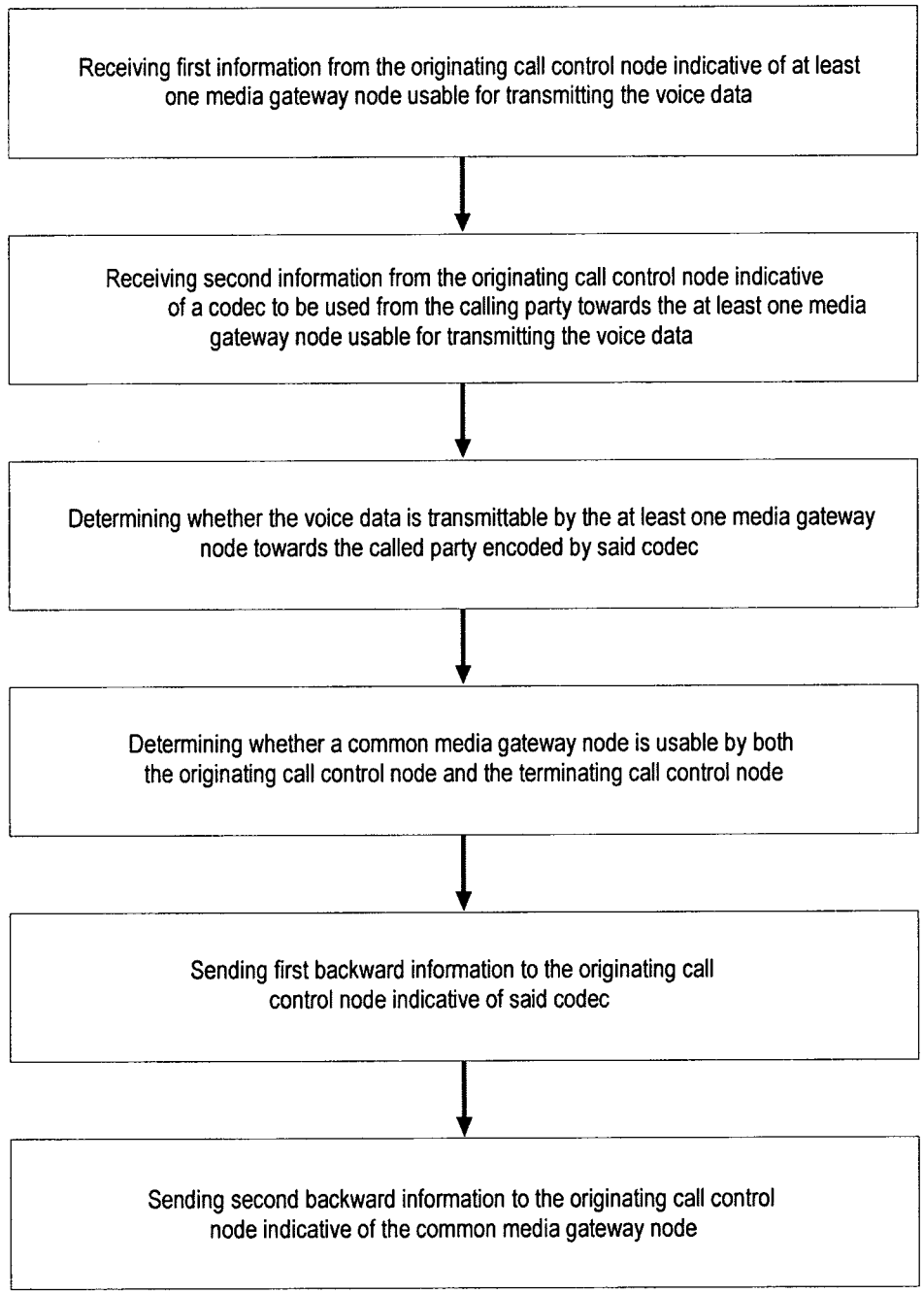
FIG. 4 is a flow diagram illustrating a method of setting up transmission of voice data according to an exemplary embodiment of the invention, executed by the terminating call control node in FIG. 1.

In the following, referring to FIG. 4, an operation of the terminating call control node MSC-S2 according to a method for setting up transmission of voice data from the calling party towards the called party via the common media gateway node MGW-1 according to an exemplary embodiment will be explained in more detail.

The method comprises receiving first information from the originating call control node MSC-S1 indicative of at least one media gateway node MGW-1, MGW-2 usable for transmitting the voice data and receiving second information from the originating call control node MSC-S2 indicative of a codec PCM to be used from the calling party towards the at least one media gateway node MGW-1, MGW-2 usable for transmitting the voice data in a single message IAM. Further, the method comprises determining whether the voice data is transmittable by the at least one media gateway node MGW-1, MGW-2 towards the called party encoded by the codec PCM and determining whether a common media gateway node MGW-1 is usable by both the originating call control node MSC-S1 and the terminating call control node MSC-S2. If the determinations are positive, the terminating call control node MSC-S2 selects the common media gateway MGW-1 and the codec PCM as the codec useable by the common media gateway MGW-1. The method comprises sending first backward information to the originating call control node MSC-S1 indicative of the selected codec PCM and sending second backward information to the originating call control node MSC-S1 indicative of the common media gateway node MGW-1.

Figure 5:
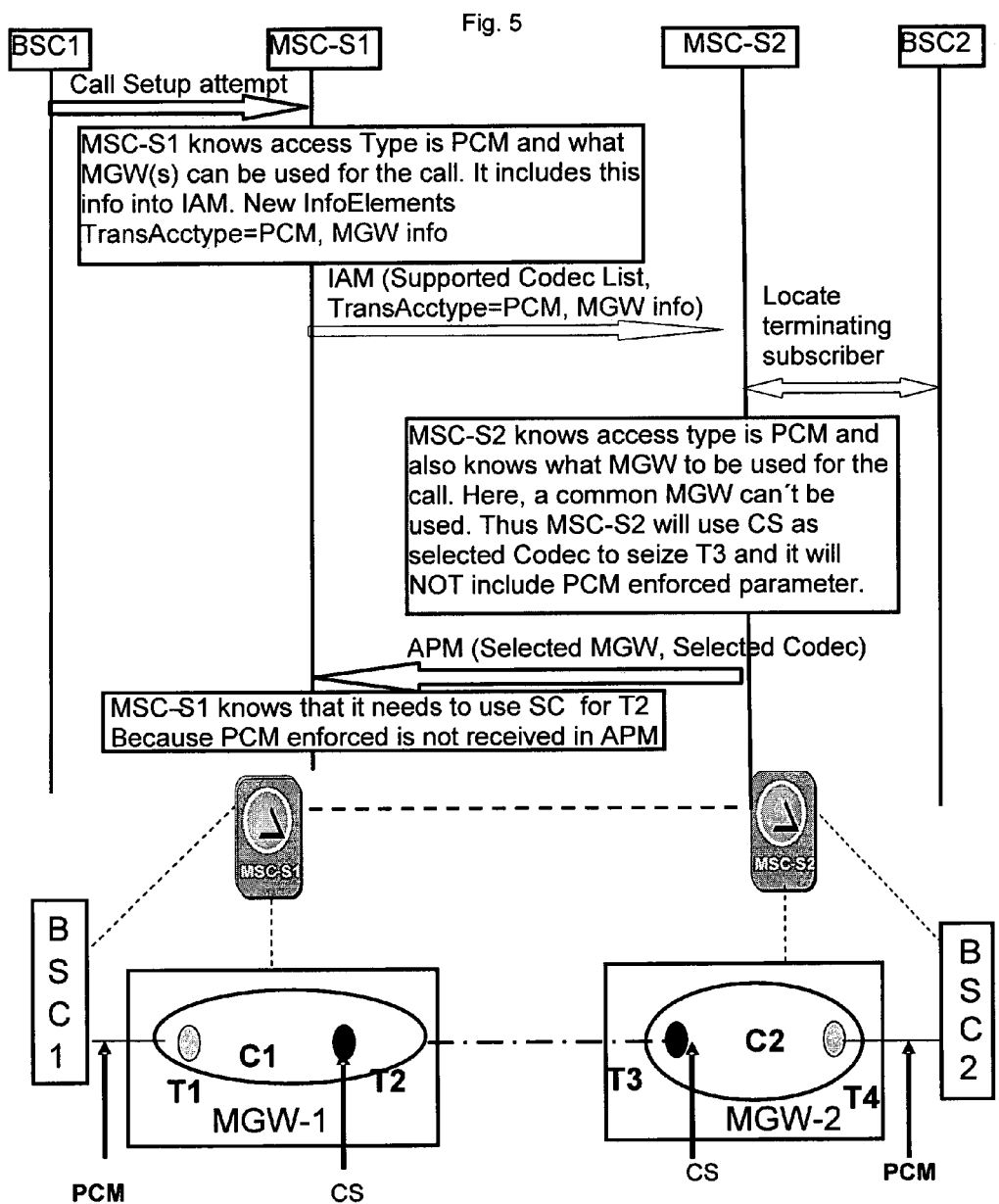
FIG. 5 is a further flow diagram on a node level illustrating a mobile to mobile call set up for a transmission of voice data according to an exemplary embodiment of the invention.

Referring to FIG. 5, a set up of transmission of voice data from the calling party to the called party will be explained on a node level, wherein no common media gateway node MGW-1, MGW-2 will be selected for transmitting the voice data.

In the particular case, the originating call control node MSC-S1 is adapted to use the media gateway node MGW-1 for transmitting the voice data. Further, the voice data is transmitted towards the media gateway node MGW-1 using PCM as codec. Further, the terminating call control node MSC-S2 is adapted to use the media gateway node MGW-2, but not the media gateway node MGW-1 for transmitting the voice data. The codec usable for transmitting the voice data from the media gateway node towards the terminating communication entity BSC2 is also PCM.

The set up of the transmission of the voice data illustrated in FIG. 5 is identical to the set up of the transmission of the voice data illustrated in FIG. 1 until determining the third information for the terminating communication entity BSC2 on the usable media gateway node MGW-2.

Thus, subsequent to sending a call setup attempt from the originating communication entity BSC1 to the originating call control node MSC-S1 an IAM-message containing the codec and the media gateway nodes MGW-1 usable by the originating call control node MSC-S1 is sent to the terminating call control node MSC-S2. The terminating call control node MSC-S2 locates the terminating subscriber, namely the terminating communication entity BSC2, and thus determines information on the particular codec and the media gateway node MGW-2 usable for transmitting the voice data, respectively.

Thus, a two context configuration (PCM to PCM) via two media gateway nodes MGW-1, MGW-2 is detected, since no common media gateway node MGW-1, MGW-2 can be determined. The terminating call control node MSC-S2 uses the selected codec, namely compressed speech CS, on the termination T3 of the media gateway node MGW-2. Further, the terminating call control node MSC-S2 sends an APM to the originating call control node MSC-S1 comprising information on the selected media gateway node MGW-2 and the selected codec CS. In particular, no information on the enforcement of PCM parameters on the termination T3 is included in the APM.

The originating call control node MSC-S1 receives the APM and uses the selected codec CS at the termination T2 of the media gateway node MGW-1.

Thus, if no common media gateway node can be selected by the terminating call control node MSC-S2, the transmission of the voice data is mediated by the two media gateway node MGW-1, MGW-2 with a transcoding operations from PCM to CS being comprised within the used media gateway node MGW-1 and a transcoding operation from CS to PCM being comprised within the used media gateway node MGW-2.

Figure 6:
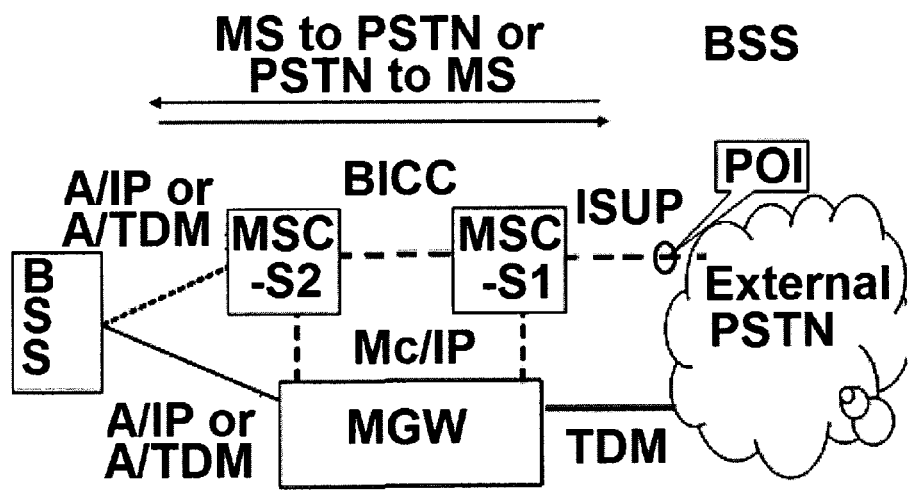
FIG. 6 is a block diagram illustrating a network configuration used during a mobile to PSTN call set up for a transmission of voice data according to an exemplary embodiment of the invention.

FIG. 6 shows a network configuration during a "local break-out call" referring to a mobile station MS to a public switched telephone network PSTN call or to a PSTN to MS call according to an exemplary embodiment. Here, interconnection of the MS communications network to the PSTN communications network is referred to as "Point of Interconnection P01". The term "local" refers to using only one media gateway node MGW in the user plane for transmitting the voice data. Further, a local break-out call may be a regarded as a "local PCM call", namely a call from MS to any POI, but not necessarily the PSTN, using PCM as the codec type, wherein a data transcoding from PCM to another codec occurs at the POI connection.

In a user plane, a calling party comprises an originating Base Station Subsystem BSS comprising a mobile phone (not shown) and an originating communication entity BSC, here a base station controller.

The Base Station Subsystem BSS belongs to the Radio Access Network RAN. The Base Station Subsystem BSS supports both an A-Interface over Internet Protocol (AoIP) interface and an A-Interface over Time Division Multiplexing (AoTDM) interface, wherein the Base Station Subsystem BSS is adapted to mainly use the AoTDM interface for avoiding unnecessary IP or TDM transcoding operations within a used media gateway node MGW but to use the TDM coding between the Base Station Subsystem BSS and the media gateway nodes MGW as well as to use existing Transcoder and Rate Adaption Units (TRAU) in the Base Station Subsystem BSS.

A called party comprises the POI connection, whose characteristics are, in the particular case, determined by the terminating communication entity PSTN.

In the following, the originating communication entity is referred to using the abbreviation BSC. The originating communication entity BSC is adapted to communicate with the terminating communication entity PSTN via a single media gateway node MGW. A communication in the user plane call path from the originating communication entity BSC to the media gateway node MGW is based on AoIP or AoTDM, and a communication used from the media gateway node MGW to the terminating communication entity PSTN is based on TDM.

In the control plane, the originating call control node MSC-S1 is adapted to control and communicate with the originating communication entity BSS using AoIP or AoTDM. Further, the originating call control node MSC-S1 is adapted to control or communicate with the media gateway node MGW-1 using the Mc/IP Interface. The originating call control node MSC-S1 and the terminating call control node MSC-S2 are adapted to communicate with one another based on BICC. The terminating call control node MSC-S2 is adapted to control or communicate with the media gateway node MGW-1 using the Mc/IP Interface and to control or communicate with the terminating communication entity PSTN using ISUP (Integrated Services Digital Network User Part).

Figure 7:
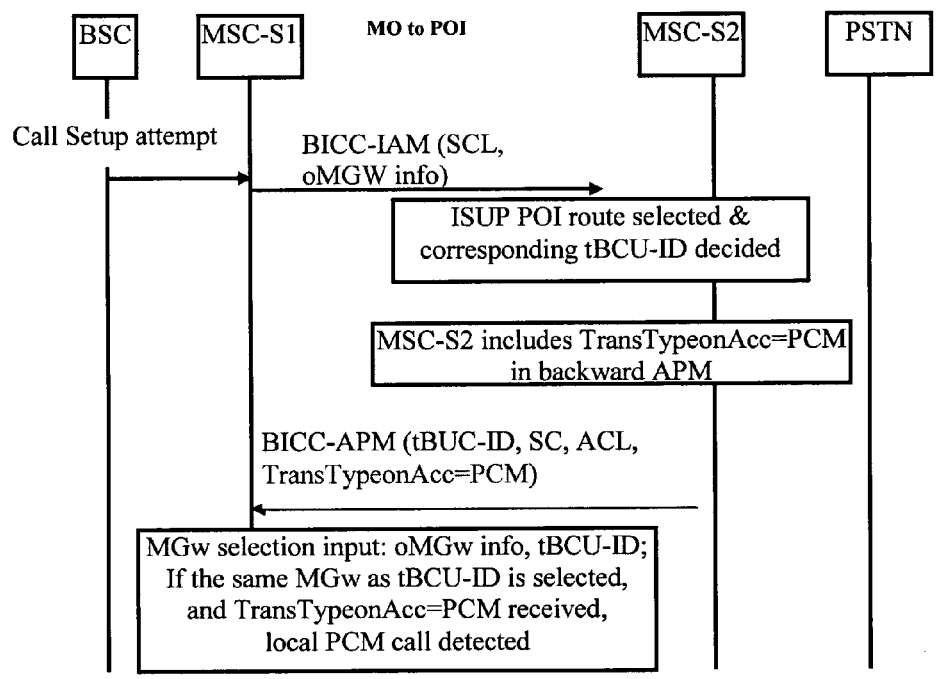
FIG. 7 is a flow diagram on a node level illustrating the set up of transmission of voice data in FIG. 6.

Referring to FIG. 7, setting up a transmission of voice data during a call from the originating communication entity BSC to the terminating communication entity PSTN is illustrated on a node level.

The originating communication entity BSC sends a call setup attempt to the originating call control node MSC-S1, which in turn sends an IAM to the terminating call control node MSC-S2. The IAM contains first information on the supported codec list (SCL) comprising codecs which can be used from the originating communication entity BSC towards the media gateway node MGW and second information on one or more media gateway node(s) MGW usable by the originating call control node MSC-S1 for transmitting the voice data (oMGW info).

The terminating call control node MSC-S2 locates the subscriber of the call by selecting the particular ISUP P01 route and thereupon decides the media gateway node MGW usable by the terminating call control node MSC-S2 for transmitting the voice data in that the terminating call control node MSC-S2 decides the identifier tBCU-ID (terminating Bearer Control Unit-Identifier) for the particular media gateway node MGW.

Since the terminating call control node MSC-S2 knows the access codec type of the terminating communication entity POI, namely PCM, and the media gateway node MGW usable for establishing a connection to the terminating communication entity PSTN, the terminating call control MSC-S2 detects a 2 context (PCM to PCM) call via a single media gateway node MGW. Thus, after selecting the common media gateway node MGW for data transmission during the local break-out call, the terminating call control node MSC-S2 sends an APM to the originating call control node MSC-S1, wherein the APM comprises first backward information on the codec PCM (TransTypeonAcc=PCM) or, more generally speaking on the particular POI connection type, and second backward information on the selected media gateway node MGW in the form of the tBUC-ID for the selected media gateway node MGW. Further, the APM contains information on the selected codec SC which will not be used within the media gateway node MGW and the Available Codec List ACL which comprises the codecs usable towards the terminating communication entity PSTN. Here, the selected codec SC form part of the ACL.

The originating call control node MSC-S1 knows from the backward information received in the APM that the particular type of codec from the media gateway node MGW towards the terminating communication entity PSTN is PCM. Thus, based on this first backward information and the second backward information as to the media gateway node MGW selected by the terminating call control node MSC-S2, the originating call control node MSC-S1 selects the common media gateway node MGW for data transmission.

Figure 8:
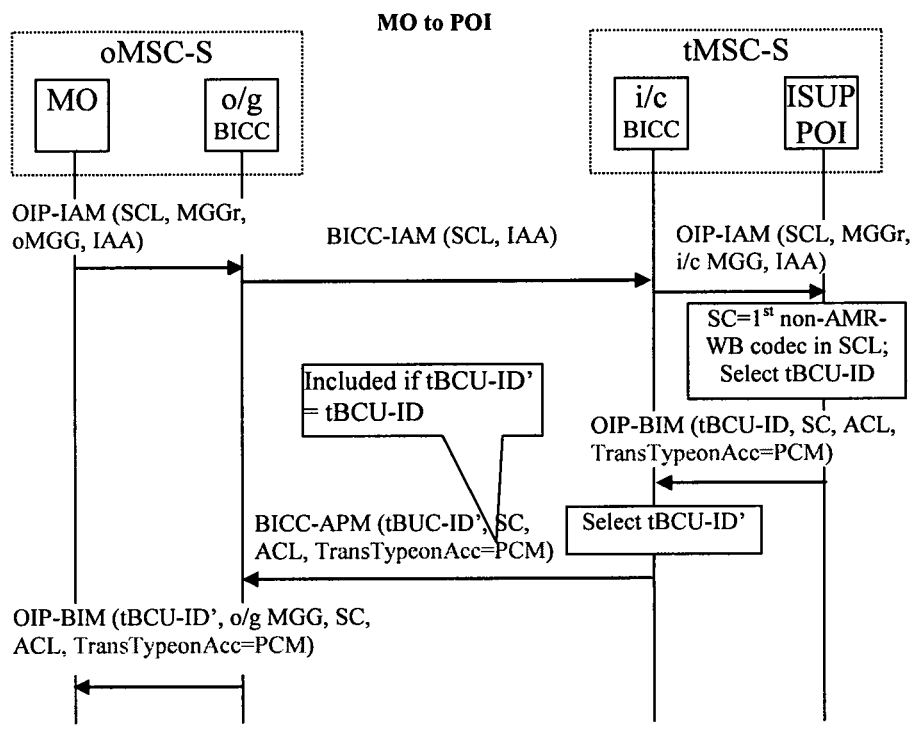
FIG. 8 is a flow diagram on a node level internal of an originating call control node and a terminating call control node in FIG. 6.

Referring to FIG. 8, a flow diagram on a node level internal of the originating call control node MSC-S1 and the terminating call control node MSC-S2 for setting up the transmission of the voice data in FIG. 7 is illustrated.

Similarly to the originating call control node MSC-S1 and the terminating call control node MSC-S2 as illustrated in FIG. 3, each of the originating call control node MSC-S1 and the terminating call control node MSC-S2 comprises an originating protocol entity 802, 806 and a terminating protocol entity 804, 808, respectively. The originating protocol entity 802 is indicated by the term "MO" (mobile originating side), the terminating protocol entity 804 is indicated by the term "o/g BICC" (out/going BICC), the originating protocol entity 806 is indicated by the term "i/o BICC" (in/coming BICC), and the terminating protocol entity 808 is indicated by the term "ISUP POI" (Integrated Services Digital Network User Part Point of Interconnection).

The originating protocol entity 802 sends an OIP-IAM to the terminating protocol entity 804 comprising first information on the media gateway node MGW usable by the originating call control node MSC-S1 for transmitting the voice data (oMGG) and second information on the supported codec list SCL comprising the codecs which can used towards the media gateway node MGW. Further, the OIP-IAM comprises a media gateway node selection indicator (MGGr) and information on the incoming access area (IAA). The IAA may not be an essential parameter in determining a common media gateway node MGW usable by both the originating call control node MSC-S1 and the terminating call control node MSC-S2 and can thus be omitted in the OIP-IAM. However, the information on the IAA may help the terminating call control node MSC-S2 to select the appropriate ISUP POI route such that the common media gateway node MGW will be used for transmitting the voice data.

The terminating protocol entity 804 translates the OIP-IAM into an IAM which is sent to the originating protocol entity 806 of the terminating call control node MSC-S2 comprising the first and second information on the usably media gateway node MWG (oMGG) and the SCL, respectively.

The originating protocol entity 806 of the terminating call control node MGC-S2 receives the IAM and translates the IAM into a further OIP-IAM which is sent to the terminating protocol entity 808 of the terminating call control node MSC-S2. The further OIP-IAM comprises the information on the Supported Codec List SCL, the terminating Media Gateway selection indicator (MGGr), the media gateway nodes usable by the incoming side of the terminating call control node MSC-S2 (i/c MGG), and the IAA. Upon translating the IAM into the OIP-IAM, the Supported Codec List SCL may be modified by the originating communication entity 806 in that one or more codecs which are not supported or understand by the terminating call control node MSC-S2 are removed from the list.

The terminating protocol entity 808 locates the subscriber of the call, namely the terminating communication entity PSTN.

The terminating protocol entity 808 then selects the first non-AMR-Wideband (WB) codec in the supported codec list SCL as the selected codec SC usable towards the terminating communication entity PSTN. The terminating protocol entity 808 further determines the media gateway node MWG usable by the terminating call control node MSC-S2 for transmitting the voice data towards the terminating call control node PSTN and thus selects the media gateway node MGW by selecting its terminating Bearer Control Unit identifier tBCU-ID.

The terminating protocol entity 808 then sends an OIM-BIM to the originating protocol entity 806 comprising first information on the media gateway node MGW in the form of the identifier tBCU-ID and second information on the particular codec type PCM (TransTypeonAcc=PCM). Further, information on the selected codec SC and on the available codec list ACL is included in the OIP-BIM.

The originating protocol entity 806 receives the OIP-BIM and thereupon selects the media gateway node MWG usable by the originating protocol entity 806 of the terminating call control node MSC-S2 by selecting its identifier tBCU-ID'.

The originating protocol entity 806 sends an APM to the terminating protocol entity 804 comprising the first and second backward information on the codec PCM (TransTypeonAcc=PCM) and the media gateway node MGW (tBCU-ID'). Further, the ACL and the SC is also included in the BICC-APM. The information on the codec PCM usable by the terminating call control node MSC-S2 for transmitting the voice data is only included, if the identifiers tBCU-ID and tBCU-ID' coincide, i.e. if the media gateway node MGW is usable by the originating protocol entity 806 and the terminating protocol entity 808.

Figure 9:
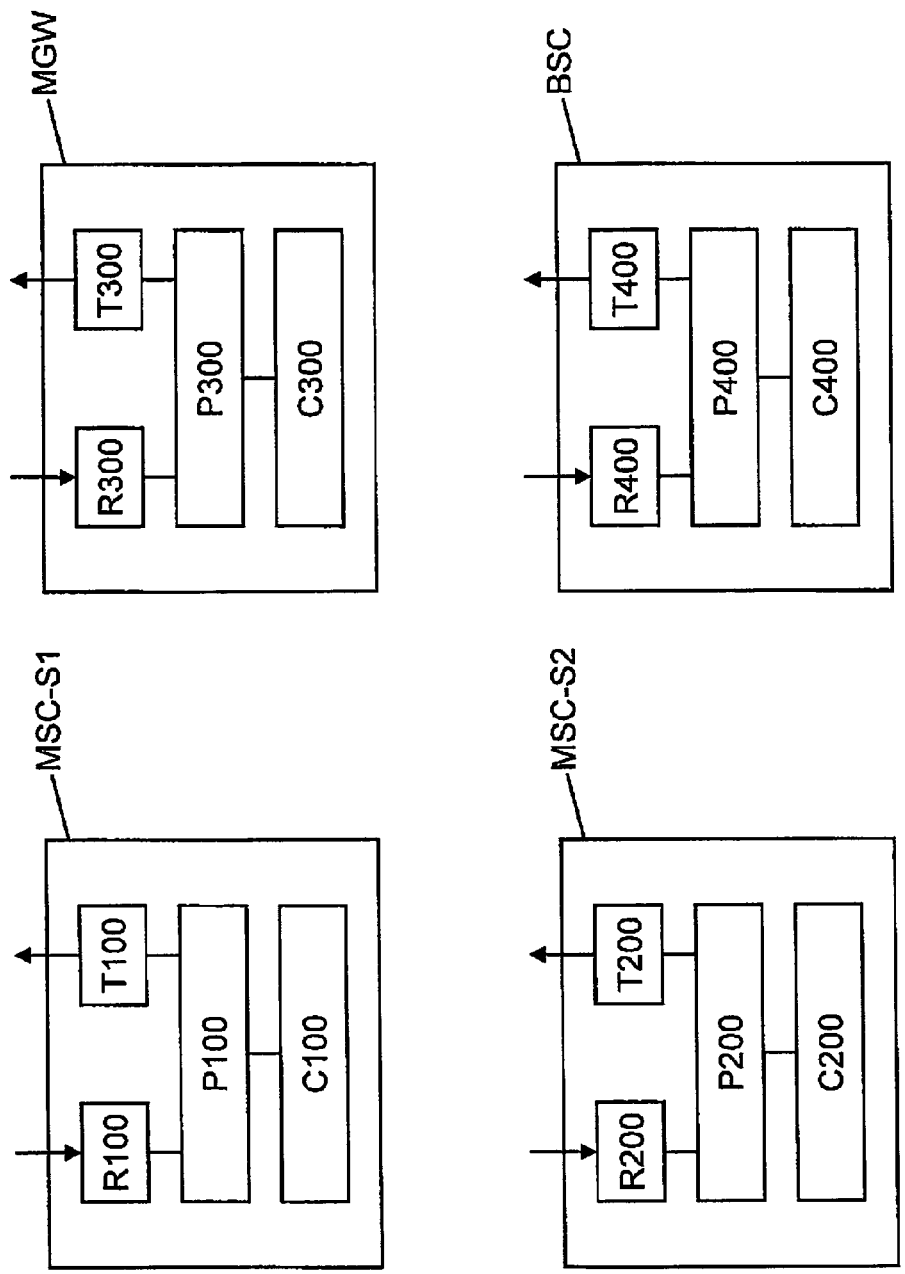
FIG. 9 illustrates a constitution of an originating call control node, of a terminating call control node, of a media gateway node, and of a calling or called party according to an exemplary embodiment of the invention.
Figure 10:
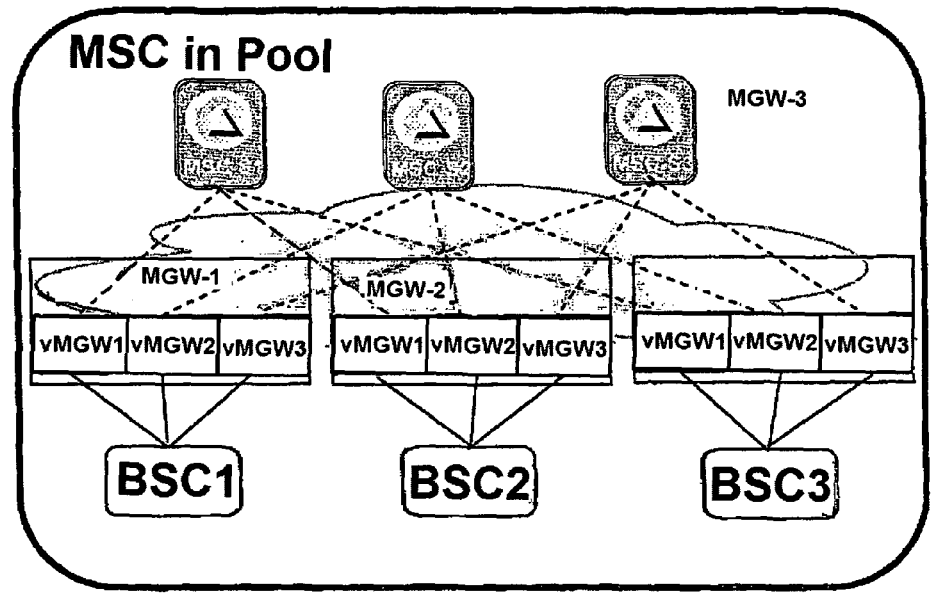
FIG. 10 is a block diagram illustrating a network comprising a Mobile Switching Center in Pool.
Figure 11:
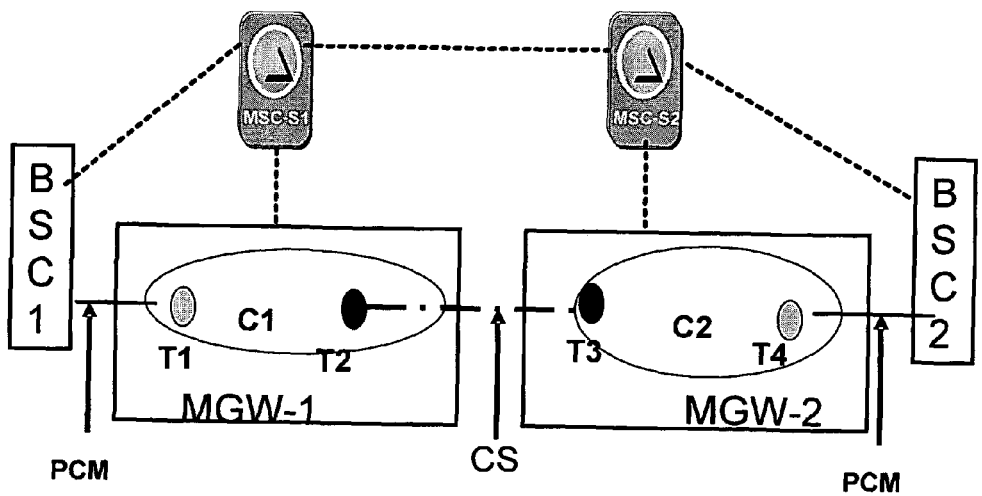
FIG. 11 is a block diagram illustrating a conventional network configuration used during setting up a transmission of voice data from a calling party to a called party.
Figure 12:
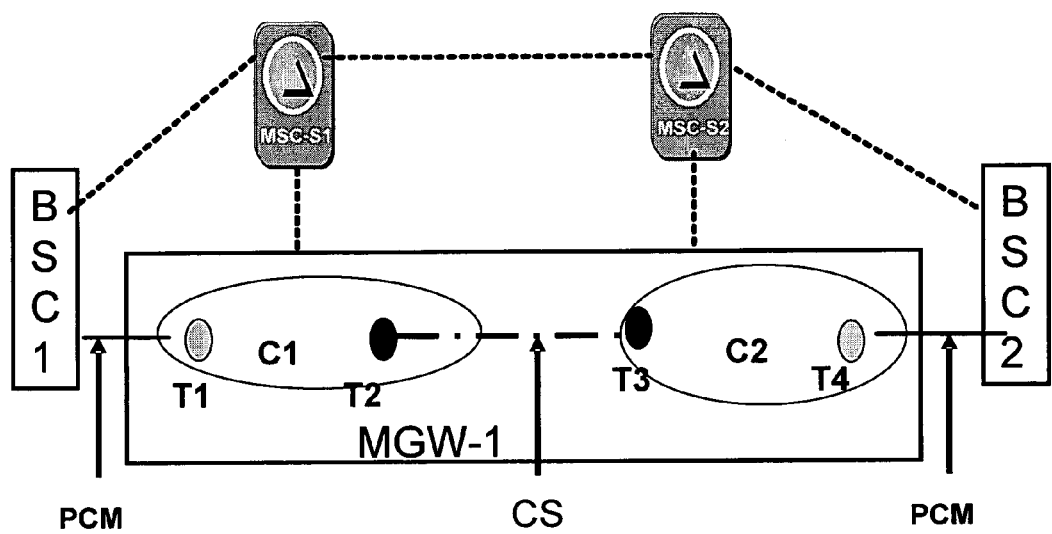
FIG. 12 is a block diagram illustrating a further conventional network configuration used during setting up a transmission of voice data from a calling party to a called party.

The terminating protocol entity 804 sends a further OIP-BIM to the originating protocol entity 802 of the originating call control node MSC-S1 comprising the information on the selected media gateway node MGW (tBCU-ID') and that PCM is used as common codec within the media gateway node MWG (TransTypeonAcc=PCM). Further, the ACL, the media gateway nodes MGW usable by the originating protocol entity 804 (o/g MGG), and the SC are also included in the OIP-BIM. FIG. 9 illustrates a constitution of an originating call control node MSC-S1, of a terminating call control node MSC-S2, of a media gateway node MGW, and of a calling or a called party BSC according to an exemplary embodiment of the invention.

The originating call control node MSC-S1 may comprise a receiving unit R100, a transmission unit T100, a processing unit P100 and a storage unit C100. The terminating call control node MSC-S2 may also comprise a receiving unit R200, a transmission unit T200, a processing unit P200 and a storage unit C200. Also media gateway node MGW may comprise a receiving unit R300, a transmission unit T300, a processing unit P300 and a storage unit C300. In a similar manner, a calling or a called party BSC may also comprise a receiving unit R400, a transmission unit T400, a processing unit P400 and a storage unit C400.

Modifications and other embodiments of the disclosed invention will come to mind to one skilled in the art having the benefit of the teachings presented in the foregoing description and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for a call control node for setting up transmission of voice data from a calling party towards a called party via at least a first media gateway node, the call control node acting as a terminating call control node adapted for communicating with the first media gateway node and with an originating call control node, the method comprising:
   receiving first information from the originating call control node indicative of the first media gateway node usable for transmitting the voice data;
   receiving second information from the originating call control node indicative of a codec to be used from the calling party towards the first media gateway node usable for transmitting the voice data;
   determining whether the voice data is transmittable by the first media gateway node towards the called party encoded by the codec;
   determining whether the first media gateway is usable as a common media gateway node by both the originating call control node and the terminating call control node;
   sending first backward information to the originating call control node indicative of the codec;
   sending second backward information to the originating call control node indicative of the common media gateway node.

2. The method according to claim 1 wherein the method further comprises locating the called party serving as a destination of the transmitted voice data.

3. The method according to claim 1 further comprising at least one of:
   determining third information for the called party indicative of the first media gateway node; and
   determining fourth information for the called party indicative of a codec to be used by the first media gateway node towards the called party usable for transmitting the voice data.

4. The method according to claim 1 wherein the receiving the first information and the receiving the second information comprises receiving the first information and the second information from the originating call control node in a single message.

5. The method according to claim 1 wherein the receiving the first information and the receiving the second information comprises receiving the first information and the second information from the originating call control node in separate messages.

6. The method according to claim 1 wherein the sending the first backward information and the sending the second backward information comprises sending the first backward information and the second backward information to the originating call control node in a single backward message.

7. The method according to claim 1 wherein the sending the first backward information and the sending the second backward information comprises sending the first backward information and the second backward information to the originating call control node in separate backward messages.

8. The method according to claim 1 wherein the codec is Pulse Code Modulation.

9. The method according to claim 1 wherein at least one of the sending and the receiving is based on one of the group consisting of Bearer Independent Call Control protocol (BICC), Session Initiation Protocol (SIP), Session Initiation Protocol-T (SIP-T), and Session Initiation Protocol-I (SIP-I).

10. A terminating call control node for setting up transmission of voice data from a calling party towards a called party via at least a first media gateway node, the terminating call control node being adapted for communicating with the first media gateway node and with an originating call control node, wherein the terminating call control node comprises:
    a receiving unit configured to:
       receive first information from the originating call control node indicative of the first media gateway node usable for transmission of the voice data;
       receive second information from the originating call control node indicative of a codec to be used from the calling party towards the first media gateway node usable for transmitting the voice data;
    a first determining unit configured to determine whether the voice data is transmittable by the first media gateway node towards the called party encoded by the codec;
    a second determining unit configured to determine whether the first media gateway is useable as a common media gateway node by both the originating call control node and the terminating call control node;
    a transmitting unit configured to:
       send first backward information to the originating call control node indicative of the codec; and
       send second backward information to the originating call control node indicative of the common media gateway node.

11. The terminating call control node according to claim 10 wherein a transceiving unit comprises at least one of:
    the receiving unit;
    the first determining unit;
    the second determining unit;
    the transmitting unit.

12. The terminating call control node according to claim 10 further comprising a control unit configured to control the first media gateway node.

13. The terminating call control node according to claim 12 wherein the first media gateway node comprises four terminations; wherein the control unit is configured to control the codec usable by one termination of the four terminations.

14. The terminating call control node according to claim 12 wherein a processing unit comprises at least one of:
- the receiving unit;
- the first determining unit;
- the second determining unit;
- the transmitting unit;
- the control unit.

15. The terminating call control node according to claim 10 wherein the terminating call control unit is configured as a Mobile Switching Center server.

16. The terminating call control node according to claim 10 wherein the terminating call control unit is configured for operation in a Mobile Switching Center in Pool environment together with the originating call control node.

17. The terminating call control node according to claim 10 wherein the terminating call control unit is configured for operating in accordance with an Out of Band Transcoder Control Procedure.

18. A computer program product stored in a non-transient computer readable medium for controlling a call control node for setting up transmission of voice data from a calling party towards a called party via at least a first media gateway node, the call control node acting as a terminating call control node adapted for communicating with the first media gateway node and with an originating call control node, the computer program product comprising software code instructions which, when run on the call control node, causes the call control node to:
- receive first information from the originating call control node indicative of the first media gateway node usable for transmitting the voice data;
- receive second information from the originating call control node indicative of a codec to be used from the calling party towards the first media gateway node usable for transmitting the voice data;
- determine whether the voice data is transmittable by the first media gateway node towards the called party encoded by the codec;
- determine whether the first media gateway is usable as a common media gateway node by both the originating call control node and the terminating call control node;
- send first backward information to the originating call control node indicative of the codec;
- send second backward information to the originating call control node indicative of the common media gateway node.

* * * * *

UNITED STATES PATENT AND TRADEMARK OFFICE
CERTIFICATE OF CORRECTION

| | | |
|---|---|---|
| PATENT NO. | : 8,830,990 B2 | |
| APPLICATION NO. | : 13/391229 | |
| DATED | : September 9, 2014 | |
| INVENTOR(S) | : Mukherjee et al. | |

It is certified that error appears in the above-identified patent and that said Letters Patent is hereby corrected as shown below:

In the specification,

In Column 18, Line 7, delete "P01"." and insert -- POI". --, therefor.

In Column 19, Line 5, delete "P01" and insert -- POI --, therefor.

Signed and Sealed this
Seventeenth Day of November, 2015

Michelle K. Lee
*Director of the United States Patent and Trademark Office*